(12) United States Patent
Christie

(10) Patent No.: US 10,975,531 B1
(45) Date of Patent: Apr. 13, 2021

(54) BRIDGE HEATING SYSTEM AND METHOD OF USE

(71) Applicant: Jackson Tyler Christie, Midlothian, TX (US)

(72) Inventor: Jackson Tyler Christie, Midlothian, TX (US)

( * ) Notice: Subject to any disclaimer, the term of this patent is extended or adjusted under 35 U.S.C. 154(b) by 246 days.

(21) Appl. No.: 15/957,359

(22) Filed: Apr. 19, 2018

Related U.S. Application Data

(60) Provisional application No. 62/487,270, filed on Apr. 19, 2017.

(51) Int. Cl.
  *E01C 11/26* (2006.01)
  *E01D 19/12* (2006.01)
  *H02S 40/38* (2014.01)
  *H02S 99/00* (2014.01)

(52) U.S. Cl.
  CPC ............ *E01C 11/26* (2013.01); *E01D 19/125* (2013.01); *H02S 40/38* (2014.12); *H02S 99/00* (2013.01)

(58) Field of Classification Search
  CPC ...... E01C 11/26; E01C 11/265; E01D 19/125; H05S 40/38; H02S 99/00; H05B 3/36; H05B 3/49; H05B 3/342; H05B 3/345; H05B 3/347; H05B 3/34; H05B 3/16; H05B 3/18; H05B 3/14; H05B 3/06; H05B 3/04; H05B 3/0038; H05B 3/023; H05B 1/023; H05B 1/0294; H05B 1/0239; H05B 2203/004; H05B 2203/005; H05B 2203/007; H05B 2203/013; H05B 2203/015; H05B 2214/02
  See application file for complete search history.

(56) References Cited

U.S. PATENT DOCUMENTS 6,825,444 B1 * 11/2004 Tuan ..................... E01C 11/265
14/73

* cited by examiner

*Primary Examiner* — Shawntina T Fuqua
(74) *Attorney, Agent, or Firm* — Richard Eldredge; Eldredge Law Firm

(57) ABSTRACT

A bridge heating system includes mounting boxes, each of the mounting boxes having one or more access doors; and one or more mounting points to provide a point to attach the mounting boxes to an underneath side of a bridge; the one or more access doors are to provide access to an interior of the mounting box; heating devices secured inside each of the mounting boxes; a control system, having a thermostat; a heat generator; and a power source; the heat generator is to heat the devices; the control system is to activate heating devices based upon a predetermined temperature recorded by the thermostat.

15 Claims, 6 Drawing Sheets

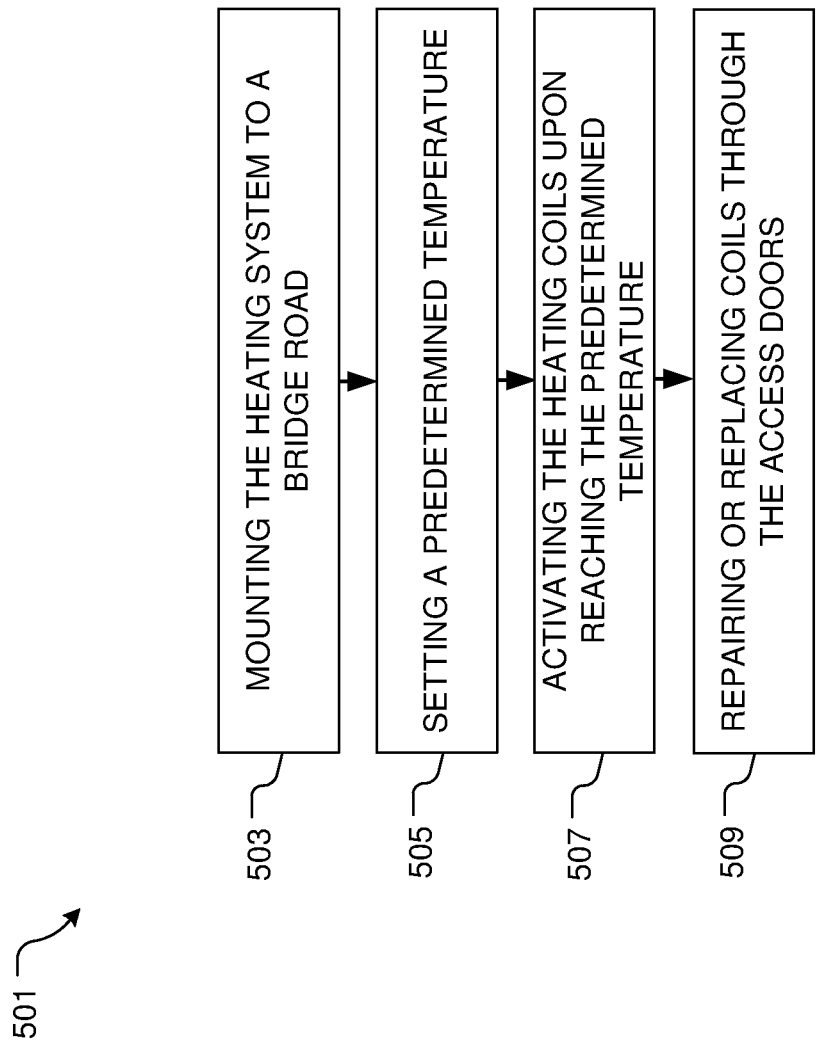

BRIDGE HEATING SYSTEM AND METHOD OF USE

BACKGROUND

1. Field of the Invention

The present invention relates generally to bridge systems, and more specifically, to a heating system for use on the underneath side of a bridge to prevent damage to the bridge during cold weather.

2. Description of Related Art

Bridge systems are well known in the art and are effective means to build roads and paths over bodies of water. For example, FIG. 1 depicts a conventional bridge system 101 having road 103 held above a body of water 105 or any other surface by a bridge 107. During use, road 103 is used for transportation across water 105.

Two of the problems commonly associated with system 101 are damage and safety. For example, in cold weather, road 103 does not receive enough heat from the earth, therefore road 103 will commonly crack and become damaged. In addition, it is common for a layer of ice to form on road 103 due to the lack of warmth, causing a safety hazard.

Accordingly, although great strides have been made in the area of bridge systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 5 is a flowchart of the method of FIG. 2; and

Figure 1:
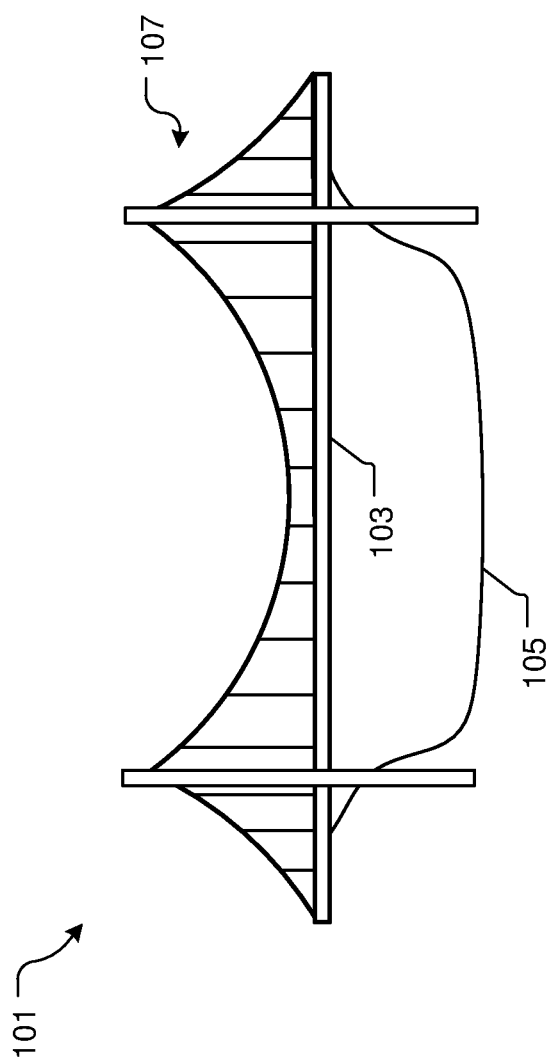
FIG. 1 is a simplified side view of a common bridge system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional bridge systems. Specifically, the present invention provides a means to heat a road of a bridge, thereby decreasing the possibility of dangerous driving conditions and damage. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
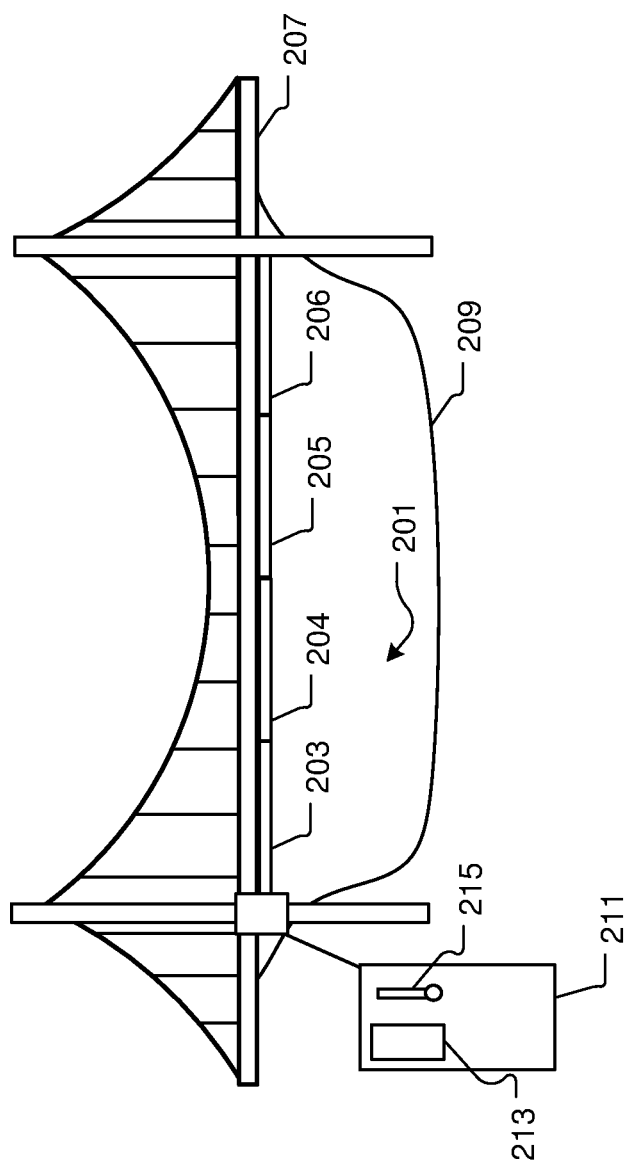
FIG. 2 is simplified side view of a bridge heating system in accordance with a preferred embodiment of the present application.

Referring now to the drawings wherein like reference characters identify corresponding or similar elements throughout the several views, FIG. 2 depicts a simplified side view of a bridge heating system 201 in accordance with a preferred embodiment of the present application. It will be appreciated that system 201 overcomes one or more of the above-listed problems commonly associated with conventional bridge systems.

In the contemplated embodiment, system 201 includes a plurality of mounting boxes 203, 204, 205, 206 secured on an underneath side of a road 207 suspended over a body of water 209 or any other surface. Mounting boxes 203-206 are connected to and controlled by a control system 211 having a power source 213 and a thermostat 215. It should be appreciated that power source 213 can be a battery, a generator, a wired electrical supply, or any other type of power source. In the preferred embodiment, control system 211 is configured to activate heating within boxes 203-206 based on a predetermined temperature as read by thermostat 215.

Figure 3:
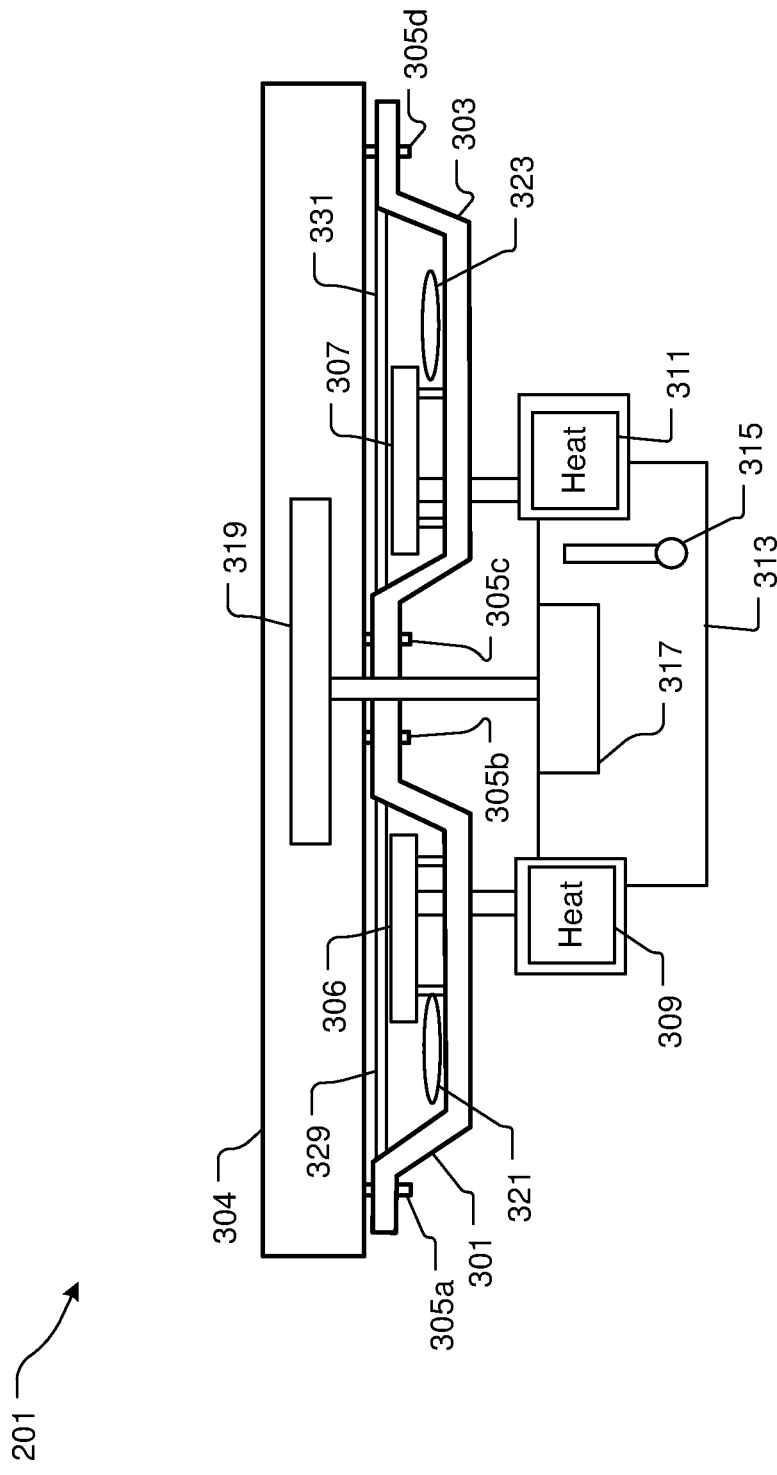
FIG. 3 is a back view of the bridge heating system of FIG. 2.

In FIG. 3, a back view of system 201 with two mounting boxes 301, 303 is shown. It should be understood that the number of mounting boxes positioned length-wise and width-wise can vary as necessary for a particular road 304. In the preferred embodiment, each box includes one or more mounting points 305a-d for securing boxes 301, 303 to road 304. In addition, each box houses a heating device 306, 307 configured to be heated by one or more heat generators 309, 311 controlled by a control system 313. In the preferred embodiment, generators 309, 311 are activated upon a thermostat 315 reaching a predetermined temperature. System 201 further includes a power source 317 configured to provide energy for system 201.

It is contemplated that system 201 can further include one or more solar panels 319 connected to and configured to charge power source 317. In addition, system 201 can include one or more fans 321, 323 contained within boxes 301, 303 and configured to circulate air within boxes 301, 303 for improved heat transfer. It is further contemplated that system 201 can include one or more conductive plates 329, 331 positioned between the plurality of heating devices 306, 307 and road 304. Conductive plates 329, 331 can be composed of a material, such as copper, for improved heat conduction to road 304.

Figure 4B:
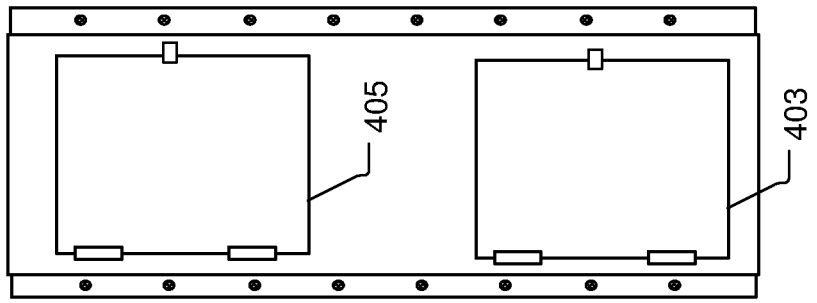
FIGS. 4A and 4B are bottom views of a mounting box of FIG. 3.
Figure 4A:
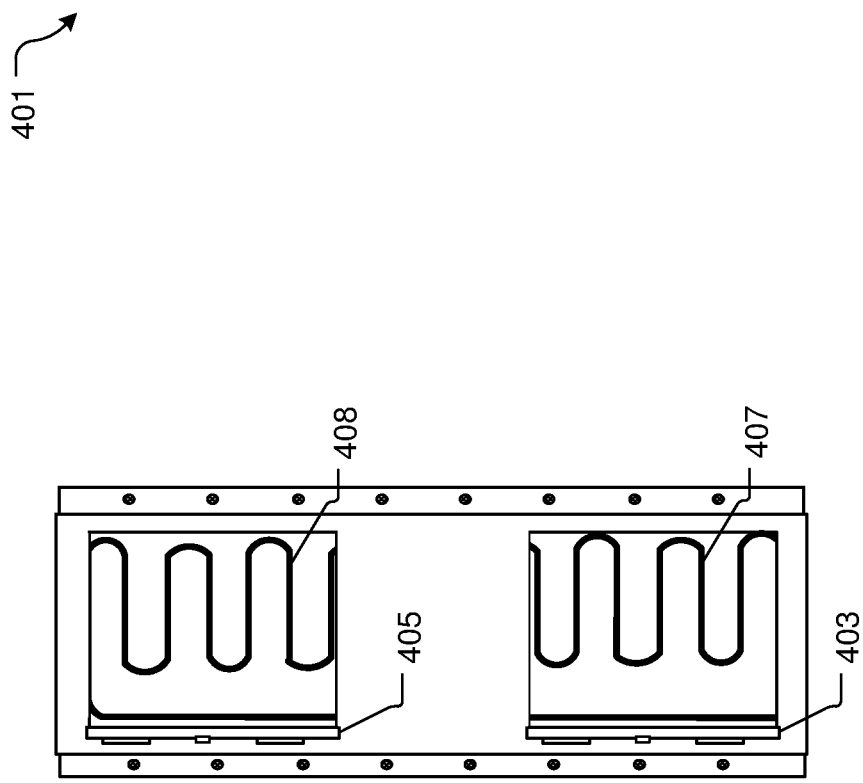

In FIGS. 4A and 4B bottom views of a mounting box 401 are shown, wherein box 401 includes one or more access doors 403, 405 configured to open (as shown in FIG. 4A) to provide access to the plurality of heating devices 407, 408 contained within box 401. Although heating devices 407, 408 are shown as coils, it should be appreciated that alternative embodiments can include heating pads, heating plates, or any other appropriate heating device having the same functionality as heating coils. It is contemplated that doors 403, 405 can be secured via a plurality of hinges or any other appropriate device for allowing doors 403, 405 to open.

It should be appreciated that one of the unique features believed characteristic of the present application is the one or more access doors positioned on the bottom of each mounting box. It should be appreciated that this feature allows for repairs to the plurality of heating coils to be made without removing the entire box.

In FIG. 5, a flowchart 501 depicts the method of system 201. During use, the plurality of mounting boxes are secured to the bottom surface of a road, as shown with box 503. The control system is programmed with a predetermined temperature, as shown with box 505. If/when the predetermined temperature is reached, the control system activates heating of the plurality of heating devices, as shown with box 507. In the event a heating coil needs to be repaired or replaced, one or more of the access doors are opened and the coil is maintained as necessary, as shown with box 509.

Figure 6:
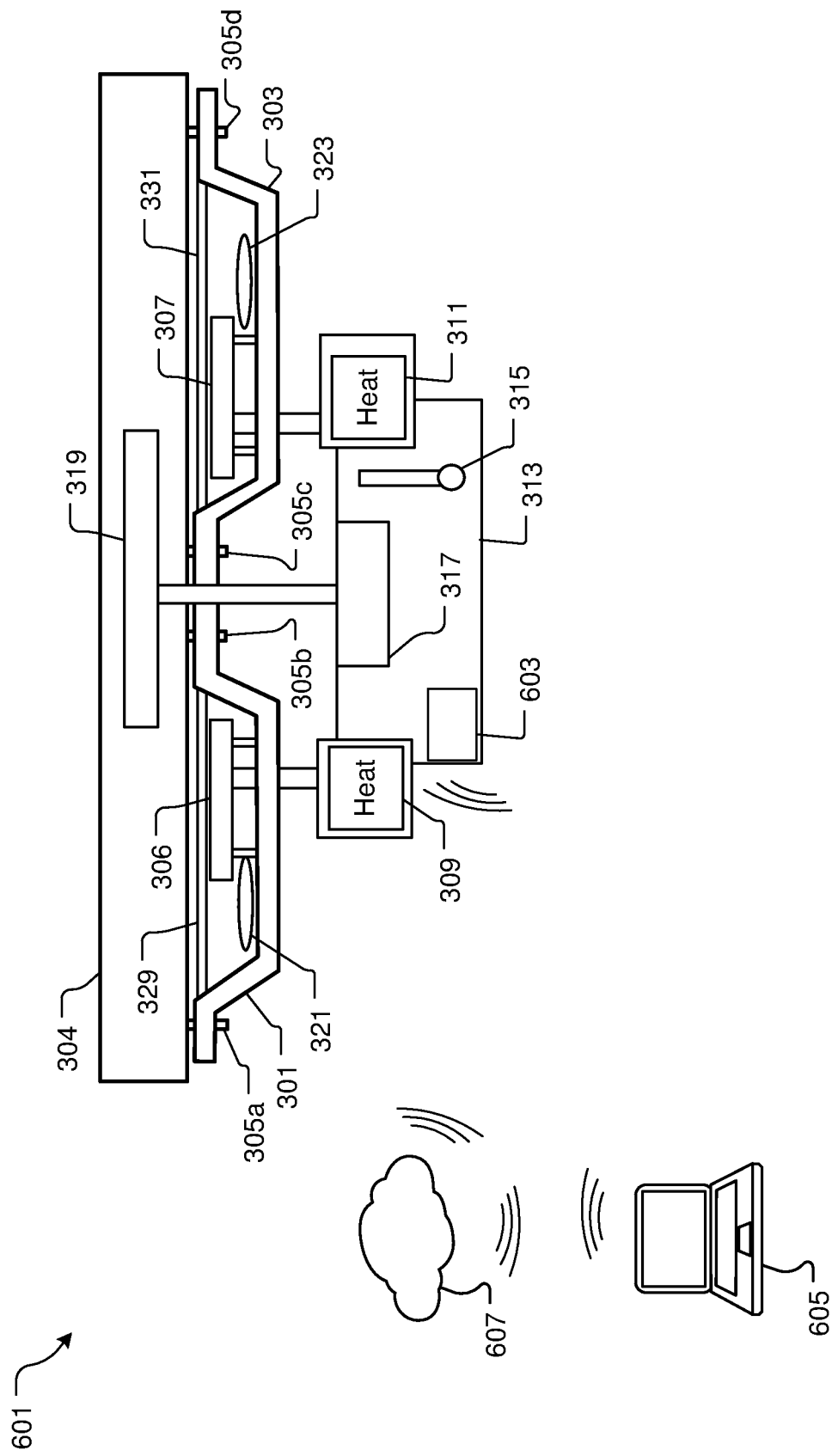
FIG. 6 is a back view of an alternative embodiment of a bridge heating system in accordance with the present application.

In FIG. 6, an alternative embodiment of a bridge heating system 601 is shown. It should be appreciated that system 601 includes all of the features discussed above and associated with system 201. In system 601, control system 313 further includes a computing device 603 configured to wirelessly communicate with a second computing device 605 through a wireless network 607. It should be appreciated that these features allow for control of system 601 remotely, including activation of heating the plurality of coils, as well as altering the predetermined temperature as desired.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A bridge heating system, comprising:
a plurality of mounting boxes, each of the mounting boxes having: one or more access doors; and
one or more mounting points configure to provide a point to attach the plurality of mounting boxes to an underneath side of a bridge;
wherein the one or more access doors are configured to provide access to an interior of the mounting box;
a plurality of heating devices secured inside each of the plurality of mounting boxes;
a control system, having:
a thermostat;
a heat generator; and
a power source; and
one or more fans secured inside the plurality of mounting boxes;
wherein the one or more fans are configured to circulate air throughout the plurality of mounting boxes, thereby evenly displacing heat from the plurality of heating coils;
wherein the heat generator is configured to heat the plurality of heating devices; and
wherein the control system is configured to activate the plurality of heating devices based upon a predetermined temperature recorded by the thermostat.

2. The system of claim 1, further comprising:
one or more solar panels electrically connected to the power source and configured to charge the power source.

3. The system of claim 1, further comprising:
a conductive plate positioned between the plurality of heating devices and the underneath side of the bridge;
wherein the conductive plate is configured to facilitate heat transfer from the plurality of heating devices to the underneath side of the bridge.

4. The system of claim 3, wherein the conductive plate is copper.

5. The system of claim 1, wherein the plurality of heating devices are heating coils.

6. The system of claim 1, wherein the plurality of heating devices are heating pads.

7. The system of claim 1, wherein the control system further comprises:
a network;
a first computing device configured to communicate with system of claim 1; and
a second computing device configured to wirelessly communicate with the first computing device;
wherein the second computing device is configured to send commands to the first computing device via the wireless network.

8. A method of heating a bridge, the method comprising:
providing the system of claim 1;
mounting the plurality of mounting boxes on the underneath side of the bridge; and
setting the predetermined temperature associated with the control system;
wherein the plurality of heating devices are activated upon the thermostat reaching the predetermined temperature.

9. The method of claim 8, further comprising:
opening the one or more access doors to access the plurality of heating devices;
and
repairing the plurality of heating devices as necessary.

10. A heating system, comprising:
a plurality of mounting boxes, each of the mounting boxes having: one or more access doors; and
one or more mounting points configure to provide a point to attach the plurality of mounting boxes to a structure;
wherein the one or more access doors are configured to provide access to an interior of the mounting box;
a plurality of heating devices secured inside each of the plurality of mounting boxes; and
one or more fans secured inside the plurality of mounting boxes;
wherein the one or more fans are configured to circulate air throughout the plurality of mounting boxes, thereby evenly displacing heat from the plurality of heating coils;
wherein the heat generator is configured to heat the plurality of heating devices; and
wherein the control system is configured to activate the plurality of heating devices based upon a predetermined temperature recorded by the thermostat.

11. The system of claim 10, wherein the structure is a bridge.

12. The system of claim 10, further comprising:
a control system, having:
a thermostat;
a heat generator; and
a power source.

13. The system of claim 10, further comprising:
one or more solar panels electrically connected to the power source and configured to charge the power source.

14. The system of claim 10, wherein the plurality of heating devices are heating coils.

15. The system of claim 10, wherein the plurality of heating devices are heating pads.

* * * * *